US011218490B2

(12) United States Patent
Goyal et al.

(10) Patent No.: US 11,218,490 B2
(45) Date of Patent: Jan. 4, 2022

(54) SYSTEM AND METHOD FOR DIRECTORY DECENTRALIZATION

(71) Applicant: MICROSOFT TECHNOLOGY LICENSING, LLC, Redmond, WA (US)

(72) Inventors: Teekam Chand Goyal, Hyderabad (IN); Deepak Pratinidhi, Hyderabad (IN); Rajiv Kumar, Hyderabad (IN); Prashant Gupta, Hyderabad (IN); Rohit Bhatia, Hyderabad (IN); Rakesh Midha, Hyderabad (IN); Ashutosh Tripathi, Hyderabad (IN); Nitin Jaiswal, Hyderabad (IN); Vinay Kumar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 16/558,160

(22) Filed: Sep. 2, 2019

(65) Prior Publication Data
US 2020/0322347 A1    Oct. 8, 2020

(30) Foreign Application Priority Data

Apr. 4, 2019 (IN) .............................. 201941013632

(51) Int. Cl.
*H04L 29/06* (2006.01)
*G06F 16/23* (2019.01)
(52) U.S. Cl.
CPC ........ *H04L 63/105* (2013.01); *G06F 16/2379* (2019.01); *H04L 63/102* (2013.01); *H04L 63/104* (2013.01)

(58) Field of Classification Search
CPC ... H04L 63/105; H04L 63/102; H04L 63/104; H04L 63/10; H04L 63/101; H04L 63/20; G06F 16/2379; G06F 21/30; G06F 21/45
See application file for complete search history.

(56) References Cited

U.S. PATENT DOCUMENTS 8,429,723 B2   4/2013   Porcari et al.
8,813,196 B2   8/2014   Weller et al.
(Continued)

OTHER PUBLICATIONS

"International Search Report and Written Opinion Issued in PCT Application No. PCT/US2020/025100", dated May 25, 2020, 11 Pages.
(Continued)

*Primary Examiner* — Edward Zee
(74) *Attorney, Agent, or Firm* — NovoTechIP International PLLC

(57) ABSTRACT

Techniques for enrolling a user in an organization directory include receiving a first request from a first user for inclusion in the directory configured to facilitate access to a collaboration application, the first request including a least a first user profile item for the first user; generating a first user account for the user assigned a first set of permissions and including a first user profile listing the first user profile item; providing a first level of access to the directory; receiving a second request from a second user transitioning the first user account from the first set of permissions to a second, broader set of permissions; verifying a first user identity for the first user based on the second request; assigning the first user account the second set of permissions; automatically updating the directory; and providing a second level of access to the directory to the first user.

20 Claims, 16 Drawing Sheets

(56) References Cited

U.S. PATENT DOCUMENTS

| | | |
|---|---|---|
| 8,849,907 B1 | 9/2014 | Hession et al. |
| 8,881,240 B1 | 11/2014 | Malik et al. |
| 9,313,207 B2 | 4/2016 | Cicchitto |
| 10,237,276 B2 | 3/2019 | Gupta |
| 2013/0091171 A1* | 4/2013 | Lee .................. H04L 63/0815 |
| | | 707/784 |
| 2013/0239166 A1 | 9/2013 | Macleod et al. |
| 2015/0058460 A1* | 2/2015 | Seago .................. H04L 41/28 |
| | | 709/223 |
| 2016/0094584 A1 | 3/2016 | Mehta et al. |
| 2016/0294881 A1* | 10/2016 | Hua .................. H04L 63/102 |
| 2017/0272445 A1 | 9/2017 | Kishida |
| 2018/0007097 A1 | 1/2018 | Malatesha et al. |

OTHER PUBLICATIONS

"OnArrival", Retrieved From: https://www.cvent.com/en/onsite-solutions/onarrival-event-check-in-software, Retrieved Date:Jun. 28, 2019, 5 Pages.

Hauser, Greg, "User Permissions in Google Analytics", Retrieved From: https://www.bounteous.com/insights/2017/06/27/user-permissions-google-analytics/, Jun. 27, 2017, 8 Pages.

\* cited by examiner

SYSTEM AND METHOD FOR DIRECTORY DECENTRALIZATION

CROSS-REFERENCE TO RELATED APPLICATION

This application claims the benefit of priority to a provisional patent application under 35 U.S.C. § 119 to India Patent Application Serial Number 201941013632, filed on Apr. 4, 2019 and entitled "System and Method for Directory Decentralization," the entirety of which is incorporated by reference herein in its entirety.

BACKGROUND

A messaging or other social network-based system allows users of the messaging system to exchange messages with other users of the messaging system as well as coordinate and share various types of information. The messages are primarily text-based, but can also comprise rich content such as images, videos, documents, audio, calendar information, etc. Other rich functionality, such as collaborative documents editing, poll creation, meeting events, etc., may also be provided within the messaging system. These systems enable users to participate in instant messaging conversations, which refer to the fact that the messaging takes place in real-time, with messages being transferred very quickly and often perceived by users to be transferred and delivered almost or practically instantaneously. The messages are transmitted and received via a network, which may include the Internet. Typically, the users have messaging accounts held within the messaging system and which they use to access the messaging system.

Within or in partnership with the messaging system, a directory system can also exist which stores names for each user, allowing for the generation and maintenance of individually identifiable identity accounts. The system can facilitate access to a listing of such identity accounts. Traditionally, organizations have worked with network administrators to build and manage the directory system, while end-users can interact with the messaging system in enterprises only if they have a corresponding identifier already in existence in the directory. Multiple users may be participants in one or more messaging groups. The messaging accounts for each user can be linked to their respective messaging group(s). A group structure often provides a convenient way for users with a common interest or goal to communicate with one another. However, while existing messaging systems offer many advantages, there remain significant areas for new and improved ideas for allowing users to easily connect to one another and foster membership in their groups.

SUMMARY

A system according to one aspect of this disclosure includes a processor and computer readable media. The computer readable media include instructions which, when executed by the processor, cause the processor to: receive a first signal, over a first data communication channel, that includes a first request from a first user for inclusion in an organization directory configured to facilitate access to a collaboration application, the first request including a least a first user profile item for the first user; provide, to the first user, a first level of access to the organization directory based on the first set of permissions being assigned to the first user account; receive a second signal, over a second data communication channel, that includes a second request from a second user for transitioning the first user account from the first set of permissions to a second, broader set of permissions, the second user being associated with a third set of permissions that is at least as broad as the second set of permissions; verify a first user identity for the first user based on the second request; assign the first user account the second set of permissions; automatically update the organization directory to reflect the change in permissions for the first user account; and provide a second level of access to the organization directory to the first user that is greater than the first level of access based on the second set of permissions being assigned to the first user account.

A method performed by a data processing system according to second aspect of this disclosure includes receiving a signal, over a data communication channel, that includes a first request from a first user for inclusion in an organization directory configured to facilitate access to a collaboration application, the first request including a least a first user profile item for the first user; generating a first user account in the organization directory for the first user based on the first request, the first user account being assigned a first set of permissions and including a first user profile listing the first user profile item; providing, to the first user, a first level of access to the organization directory based on the first set of permissions being assigned to the first user account; receiving a second signal, over a second data communication channel, that includes a second request from a second user for transitioning the first user account from the first set of permissions to a second, broader set of permissions, the second user being associated with a third set of permissions that is at least as broad as the second set of permissions; verifying a first user identity for the first user based on the second request; assigning the first user account the second set of permissions; automatically updating the organization directory to reflect the change in permissions for the first user account; and providing a second level of access to the organization directory to the first user that is greater than the first level of access based on the second set of permissions being assigned to the first user account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
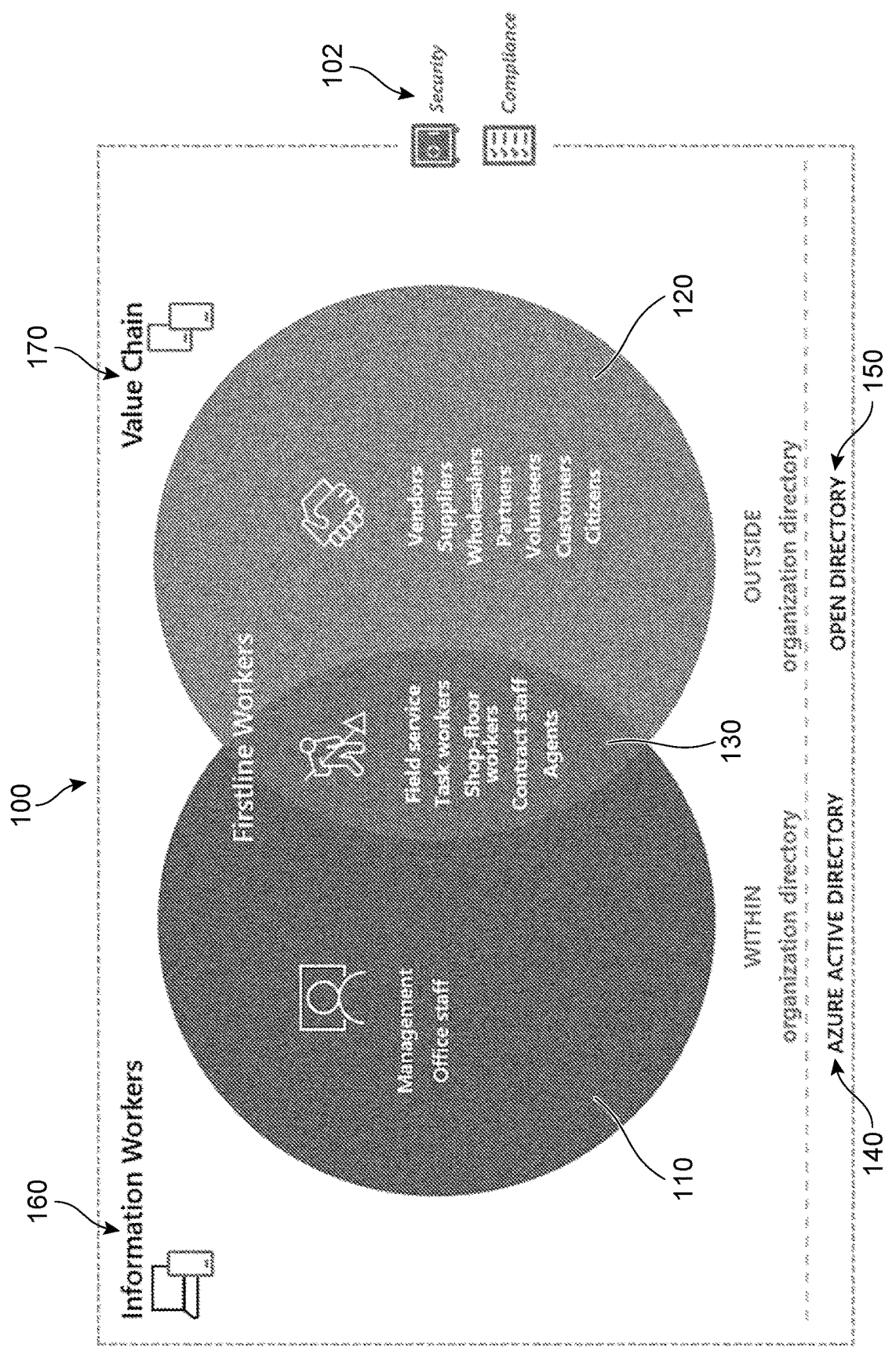
FIG. 1 is an overview of an implementation of a directory configuration for an organization.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a method and system for enabling organizations to organically build and modify their directories. As will be discussed in greater detail below, the proposed mechanisms allow a new user to be added to the organization directory by any other member of the organization. The adding member can be empowered to join or add the new user to a group in which the adding member is already a participant. At this point, the new user can implicitly become a member of the organization's "open directory". At a subsequent time, in part based on the verification policies defined by the organization, the credentials for the newly added user may be verified such that he or she transitions from a low privileged-member to a full-privileged (or higher-privileged) directory member with configured privileges.

It can be appreciated that while other invite models available in other products can allow some external users access to limited privileges for that system, the process for subsequent advances or promotions for that user within the directory organization or hierarchy can be stymied or cumbersome. The proposed approach is especially useful in the face of an increasing array of communication systems that provide a large range of capabilities, such as the integration of various communication modalities with different services. These systems enable a wider array of communication between people and organizations. Social networking applications, multimodal enterprise communication applications, messaging services, collaboration applications, and combinations thereof are becoming increasingly prevalent both for personal and business uses. For purposes of simplicity, the term "collaboration network" or "collaboration application" will be used to refer to such systems. Many of these collaboration applications employ a mechanism to maintain contacts or a directory of authorized members or users. Such mechanisms are typically managed manually by members with the necessary authorization, and information collected for a member can be difficult to transfer or maintain across the many layers of interactions and relationships that can be fostered in these social networking environments. Social networks can represent associations among users sharing various types of relationships, such as but not limited to familial, friendship, acquaintanceship, hobbies, informational, academic, business, and professional. These types of networks, enabled by collaboration applications, allow members to share data items with other users or social groups of users. Users of a collaboration application may also generate a social profile, comprising a set of data items representing the user, such as demographic information, identity-related information, a set of interests such as hobbies or professional skills, and/or a set of resources that are interesting to the user. These data items may be shared through the network with users who have an association with the user.

As a general matter, the terms "database layer" or "directory layer" refer generally to various modules or databases configured for storing profile data, including both member profile data as well as profile data for various organizations. In some implementations, when a person initially registers to become a member of a collaboration or social network service, the person is usually prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored in a database layer. Similarly, when a representative of an organization initially registers the organization with the collaboration application, the representative may be prompted to provide certain information about the organization. This information may be stored, for example, in another database. In some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Users or organizations may expend a great deal of time in simply managing their contacts and establishing a directory of trusted users. For example, organizations today maintain directories with built-in a centralized model, where users must (1) first be verified, then (2) be added to the directory, and (3) eventually be assigned to groups and resources of that organization. In addition, even when additions to the directory are made on a more ad-hoc basis, in order to provide a limited level of guest privileges, for example, if the organization later desires to 'promote' such guests to a more established status in the directory, the membership information must be entered as a new profile by a member of the organization with administrator level privileges. The previously created guest profile is thereby deleted or otherwise made defunct, resulting in an unnecessary increase in internal record-keeping and profile management tasks. Network administrators often have to manage large and complex networks that stretch across multiple domains each having a plethora of resources and users. Various tools have been developed to assist network administrators in managing such networks. For example Microsoft Active Directory® includes an identity directory that can allow network administrators to hierarchically organize objects (e.g., users, computers, groups, etc.) within a network in order to more easily assign policies, deploy software, apply software updates, and/or perform other management activities associated with one or more objects within the network.

Although these approaches are workable for organizations that have mature processes and systems in place for on-boarding and off-boarding employees, the large majority of end-users desiring a simple and reliable means of connecting with an extensive network of contacts may find it more challenging to maintain a useful collaboration system that accurately reflects their current relationship network. For example, organizations can frequently collaborate or connect with more users at a more transient or fluctuating engagement level than full-time employees or members. However, regardless of the transience of such relationships, organizations need a reliable and stable means of connecting to all personnel types within their network.

In order to better introduce the systems and methods to the reader, FIG. 1 illustrates one example high-level arrangement scenario of a possible organizational composition 100, as defined against a background of levels of access or status in that organization's directory. The organizational composition 100 can include information workers 160 that operate primarily via organization's 'home base' such as organization employees 110, and can include management as well as office staff. In some cases, the information workers 160 can also partially encompass some 'firstline workers' 130, including but not limited to field services workers, task workers, shop-floor workers, contract staff, and/or agents, or other such persons. Extending beyond this group, the organizational composition 100 can also engage with or employ additional workers or communicate with other persons to form a value chain individuals 170 that operate primarily outside of the organization's 'home base' and are often associated with an 'on site' location or task that is remote relative to the home base. These value chain entities 170 are important and necessary to the organization, but do not always formalize their relationship with the organization. Some examples of value chain entities 170 can include vendors, suppliers, wholesalers, partners, volunteers, customers, and/or citizens. In some cases, the value chain entities 170 can also partially encompass some 'firstline workers' 130 (similar to the information workers 160), including but not limited to field services workers, task workers, shop-floor workers, contract staff, and/or agents, or other such persons. Thus, there can be some overlap between members of information workers 160 and value chain entities 170.

Creating a modern, connected workplace across such a wide spectrum has become a key priority for most organizations eves as the span of that workplace continues to expand. For example, a supervisor or 'desk staff' who is an information worker may desire collaboration with a partner or vendor. However, communication with this outside entity can be riddled with organization policy barriers, access challenges, and difficulty engaging in communications through any organizational-based messaging or collaboration system. Often, the staff member may struggle to establish a collaboration pathway to the desired vendor and facilitate the vendor's access to necessary organization resources. In addition, if at a later time an employee in the organization wishes to promote the vendor to a more trusted status within their collaboration system, a new record and onboarding process will be needed. Past collaborations with the same vendor and the corresponding records are often wasted or discarded, and both parties can be frustrated by the expenditure of time.

Thus, in order for the organization to manage its relationships across such a wide spectrum, the ability to include or enroll any and all outside entities potential members as possible registered members of their system can be powerful and attractive. As illustrated in the lower portion of the organizational composition 100, in different implementations, this ability can be realized by application of a multitiered directory system in which membership in the organization can be broadly managed. In the example of FIG. 1, the left-side of the organizational composition (information workers 160), traditionally the only members with access to resources for the organization, can participate in a first-tier directory 140 (here labeled as "Azure Active Directory"). For example, this can refer to an enterprise resource directory such as but not limited to Microsoft Active Directory®, which offers a directory service protocol to provide services for centralized authentication and authorization for a network of computers. Although the name "Active Directory" may be used herein, it should be understood that any enterprise resource directory configured to also to assign policies, deploy software, help apply critical updates to an organization, and/or store information and settings in a centralized database, can be used.

Furthermore, the right-side of the organizational composition (value chain entities 170), traditionally restricted and excluded from resources and communications provided by the organization, can also participate via a second-tier directory 150 (here labeled as "Open Directory"). In other words, in some implementations, all types of users can be welcomed and organically move through various levels of resources and support offered by the organization through the second-tier directory 150.

In different implementations, the second-tier directory 150 and the first-tier directory 140 can be part of a larger, connected and integrated organization directory. Thus, information in the second-tier directory 150 can be readily accessible to those registered in the first-tier directory. In addition, there may be multiple layers of access, controls, rules, and/or policies between the first-tier directory and the second-tier directory that can facilitate the transitions that occur frequently as individuals move from one position or task to another, where each position or task requires a different level of resource access and collaboration. In one implementation, users can perform a self-registration and/or self-verification processes for quick access to the second-tier directory. By permitting the natural flow of resources and access to users in an as-needed basis, an organization can more readily benefit from its own history of past collaborations, and maintain and enforce its own preferred policies 102 (e.g., security and compliance) for each layer as well as the multitude of internal groups formed and developed in association with the directory.

Figure 2A:
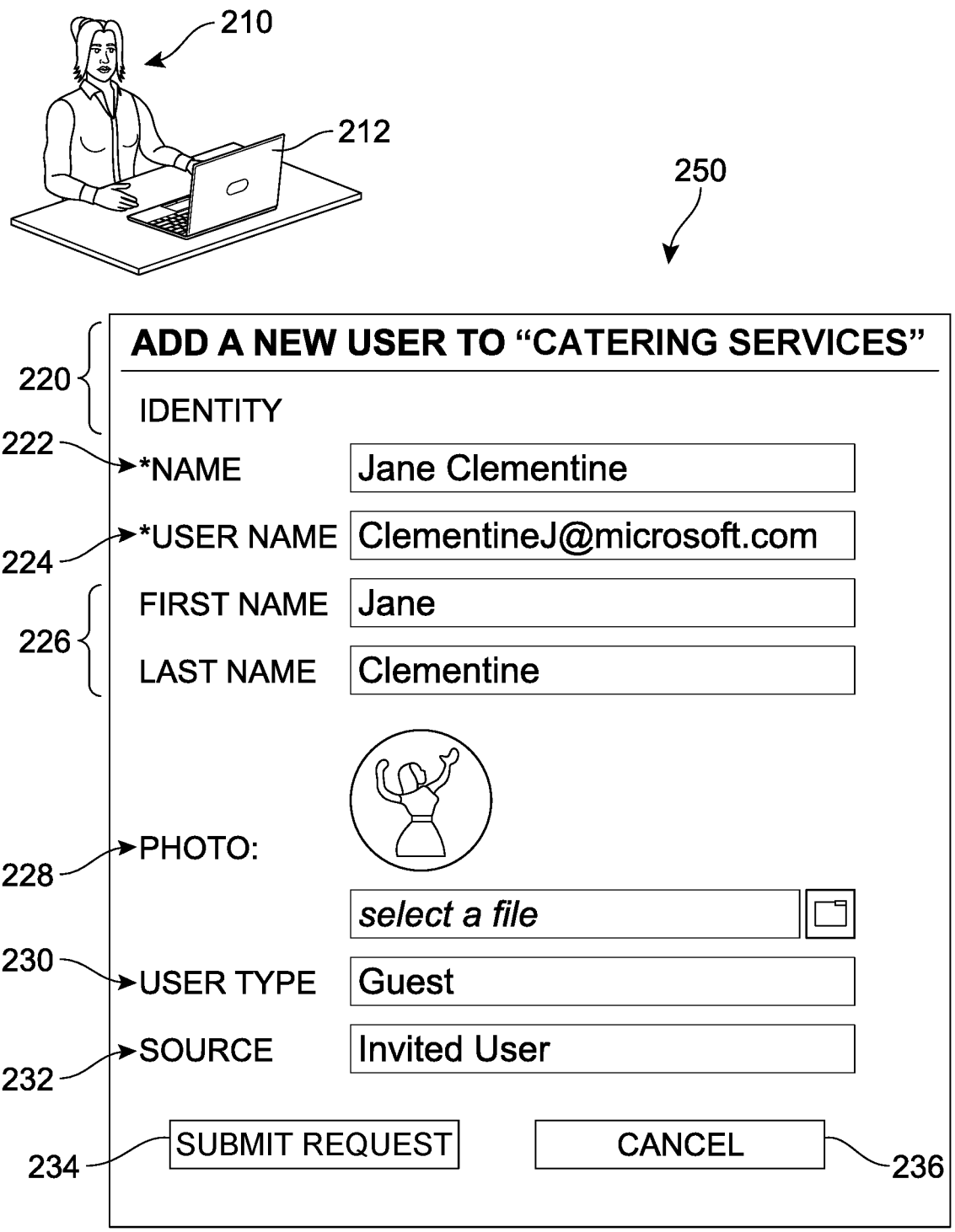
FIGS. 2A and 2B are an implementation of a directory management interface experience.
Figure 2B:

For purposes of clarity, FIGS. 2A and 2B present a high-level example of a representative directory management interface ("directory interface") experience. In FIG. 2A, an end-user is accessing an organizational directory via a native control (such as a membership portal or enrollment interface) through a first computing device ("first device") 212. In different implementations, a "native control" refers to a mechanism for communicating content through a client application to an application user. For example, native controls may include pop-up windows that may be presented to a user as software application user interfaces (UIs), interactive buttons, or other objects that may be shown to a user through native application UIs, as well as mechanisms that are native to a particular application for presenting associated content with those native controls. In different implementations, a native control can include any other type of user interface such as a dialog box, notification, alert, reminder, email, instant message, or other application communication or presentation means. In addition, a "trigger event" or "triggering event" refers to an event (or specific sequence of events) associated with a particular use of an application, which corresponds to a selection of an option offered via a native control, or an event that matches a condition. In some cases, the triggering event may be understood to include a 'click', toggle, voice command, or other input actions (such as a mouse left-button or right-button click, a touchscreen tap, a selection of data, or other input types).

In different implementations, a user interface can be accessed by one or more computing device end-users, or simply "users". As an example, one type of user may be a potential member seeking enrollment or connection with an aspect of an organization's open directory (second-tier directory). In FIG. 2A, a potential enrollee 210 is shown in the process of setting up a user account for a designated team or group using the first device 212. It can be understood that the first device 212 is configured for connection to a network.

As will be described below, in different implementations, a user interface can include a plurality of fields for receiving inputs. For example, an enrollment portal interface ("enrollment portal") 250, comprising a header 220 for informing the user what the primary purpose of the interface is (here shown as "Add a new user to 'Catering Services'" followed by an "Identity" sub-header) further includes a plurality of registration-related fields. In FIG. 2A, these fields are a Name field 222 (which can be auto-populated by entry of data into a First Name field 226 and a Last Name field 228 below), a User Name field 224, a Photo field 228 (here with a default image icon placeholder), a User Type field 230 (here selected as a Guest), and a Source field 232 (here showing the user was an Invited User). In other implementations, the application can be configured to present additional or alternate options to a user. It should be understood that a Settings option may be made available on each of the user interfaces described herein, whether or not explicitly identified through which users can adjust various field parameters or presentation formats. As potential enrollee 210 inputs her data and seeks to create a user profile via the enrollment portal 250, the potential enrollee 210 may be presented with a first selectable option ("first option") 234 to submit the enrollment request to the designated group or team as well as a second selectable option ("second option" 236) for cancelling the request. In this example, the user is requesting access to and membership in a particular group (Catering Services) that is one of many other groups or teams within a larger organization.

It should further be understood that the text and specific wording and arrangement of fields or options shown in any of the figures or described herein are for purposes of illustration only and in no way limit the manner by which the application may communicate or receive information. In addition, while the first option 234 and second option 236 are positioned beneath or below the main interface portion in FIG. 2A, it should be understood that in other implementations, such options or other fields and options may appear differently and/or may be displayed or generated anywhere else on the screen(s) associated with the client's system, including spaced apart from, adjacent to, or around the scheduler user interfaces. As an example, additional information may be required or requested and viewed by scrolling down or going to a "next" page of the interface. In other words, the figures present only one possible layout of the interface, and do not in any way limit the presentation arrangement of any of the disclosed features.

In different implementations, once the potential enrollee 210 submits the information, the directory management system can, immediately or soon after, provide a basic or minimum level of access to one or more of the team features associated with the directory or collaboration network. Thus, following a self-inputted profile and self-verification for this enrollment to "Catering Services" group, the user may be able to (without waiting for further verification from within the organization) be able to begin at least a limited enjoyment of collaboration resources and information that are now made available to her.

Referring now to FIG. 2B, in some implementations, the information self-submitted by the enrollee can be authenticated or approved by another person who is already a member of the organization. In FIG. 2B, an employee 214 accesses the organizational directory via an approval interface 260 through a second computing device ("second device") 216. It can be understood that the second device 216 is configured for connection to a network. In FIG. 2B, the employee 214 is shown in the process of reviewing and approving the user profile created in FIG. 2A. Although this type of approval interface 260 may in many cases also be referred to as an admin portal, it can be appreciated that in different implementations, the person using this interface with the purpose of verifying, authenticating, approving, promoting, or otherwise vetting a new user account need not be associated with an Administrator status within their organization. Instead, in some implementations, the approver may be any registered member of the Active Directory (first-tier directory) with permission to approve a new user for this particular group ('Catering Services').

Thus, the employee 214 can be a supervisor or team leader for Catering Services, one of many groups of the organization, and be authorized to review the inputted fields displayed in the approval interface 260, which includes a header 240 for informing the user what the primary purpose of the interface is (here shown as "Approve new user for access to group?" followed by a "Group: Catering Services" sub-header) and further includes a plurality of user information data. In FIG. 2B, these fields are a Name 242, a User Name 244, a First Name 244, a Last Name 246, a Photo 248 (which has been changed to the user's now-approved profile picture), a User Type 250 (promoted to Team Collaborator), and a Source 252 (referring to the approver, who identifies as a Team Leader).

As the employee 214 reviews the data and proceeds with verifying the new user profile for activation in the group, the employee 214 may be presented with a third selectable option ("third option") 254 to submit the approval request to the organization as well as a fourth selectable option ("fourth option 256) for cancelling the process. In other implementations, the application can be configured to present additional or alternate information to an approver. Once the approver submits his approval, the enrollee may have increased access to organizational resources or the ability to interact to a greater degree via the collaboration application than the initial 'basic access' that was provided to her following her initial enrollment. Thus, it can be appreciated that a user's access level to the system can be readily changeable and adjustable, regardless of whether he or she is a full-time or internal employee for the organization or a more transient or external-based entity interacting with the organization. Such a process facilitates a simplified exchange or transfer of personnel or contact information for users who may, across a brief span of time, be granted access from one lower access type or level to another higher level, and soon after be switched again to a lower access level, as desired by the organization, and reliance on a single record or account for the user across any of these transitions.

Figure 3:
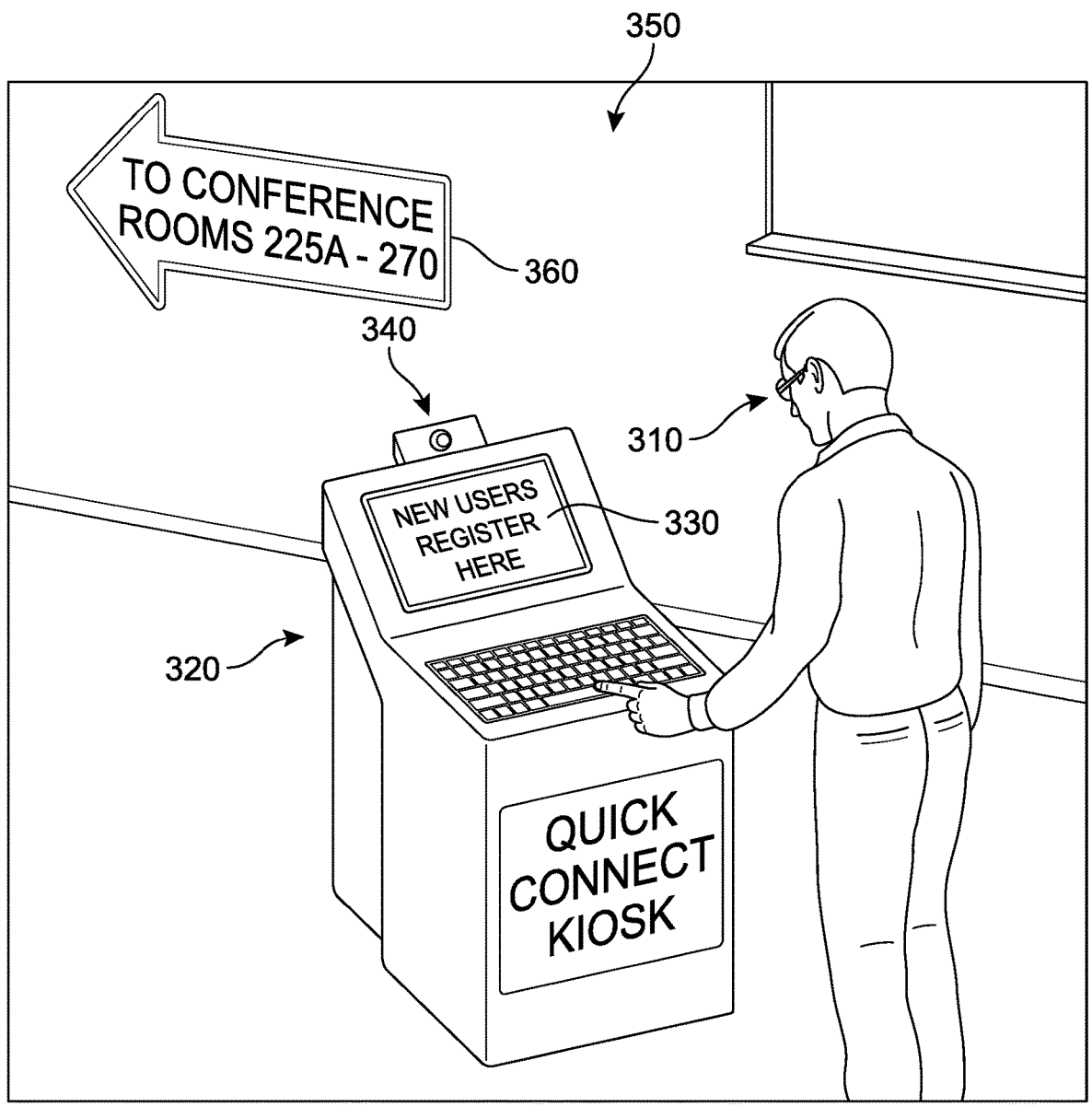
FIG. 3 is an implementation of a user accessing a directory enrollment portal.

Another implementation of a directory management interface ("directory interface") experience is presented with reference to FIGS. 3-6B. In FIG. 3, a visiting user 310 is shown accessing an enrollment portal 330 that is presented via a third device 320. In this example, the visiting user 310 has entered a building 350 or a portion of a building thereof that is associated with the organization with which he wishes to collaborate and has located a "Quick Connect" type kiosk. The kiosk in this case is configured to facilitate the ability of personnel and other users to quickly access directory-type information for the organization and request access to various resources as needed, and includes the third device 320. In other implementations a different arrangement can be provided, including but not limited to a registration webpage that is configured to appear on the user's own computing devices, call-in enrollments, or other computing terminals or interfaces that can be made available for the user to register for obtaining or modifying access level.

Figures 4A, 4B:
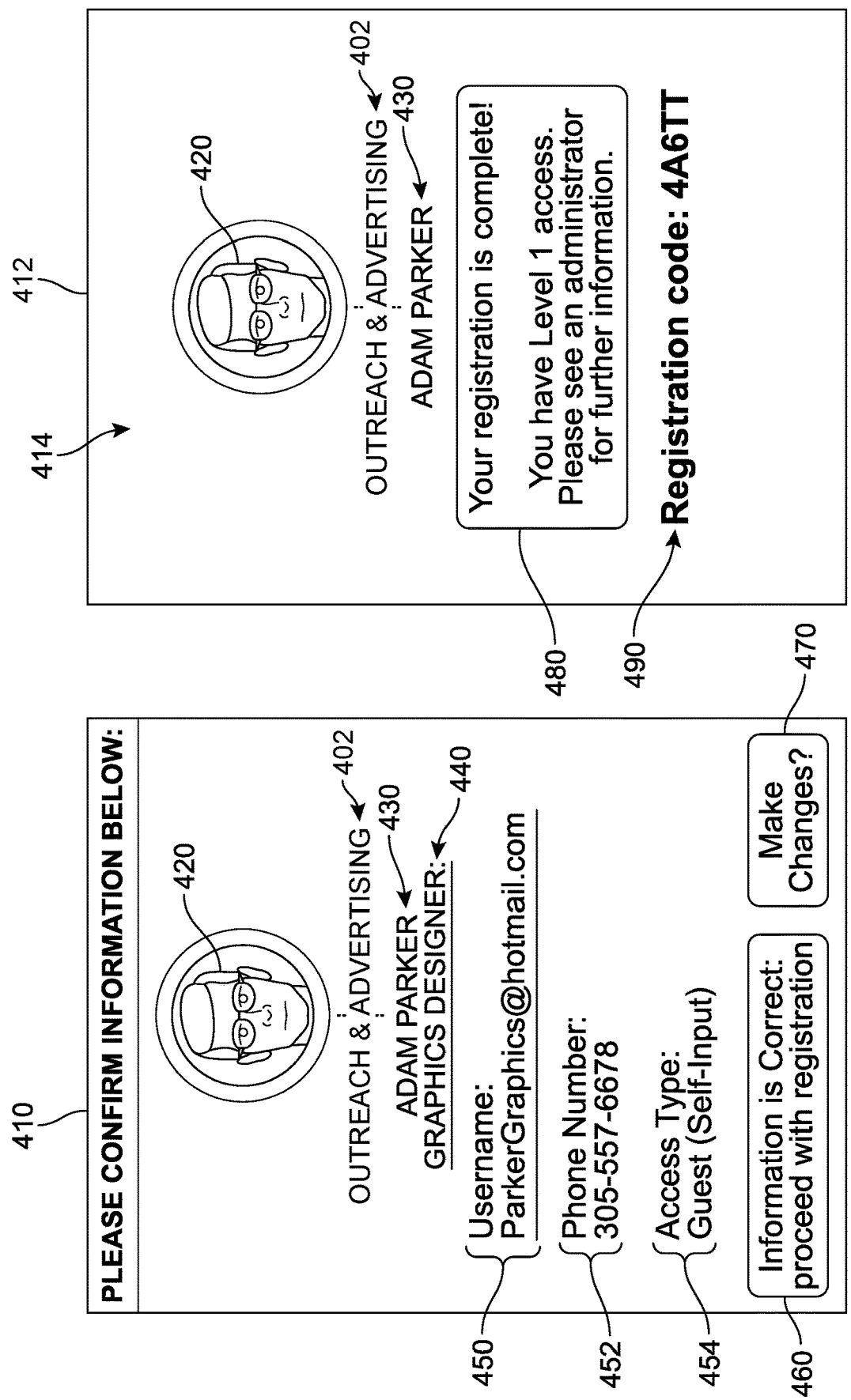
FIGS. 4A and 4B are implementations of a user interface enrollment portal for an organizational directory.

In this example, it can be assumed that the visiting user 310 is enrolling or providing his information for the first time, and so proceeding with a self-verification process. As the visiting user 310 initially interacts with the enrollment interface 330, he may input or scan one or more identifying credentials or information, including but not limited to personal information, formally issued identification, contact information, or even inherence or biometric data such as facial scans or photographs, for example via imaging device 340. Referring to FIG. 4A, one implementation of such a data entry form is shown as a first enrollment interface 410. Once the user inputs his information, the first enrollment interface 410 can in some implementations display the information that has been entered or received, for the user to review and confirm. In this example, the photo taken of the user has been captured as image 420 and is shown above, while below the image 420 is the team association 402 ("Outreach & Advertising") the user is requesting membership or other connection with, the user's name 430 ("Adam Parker"), the user's role 440 ("Graphics Designer"), the user's username 450 (ParkerGraphics@hotmail.com), the user's phone number 452 ("305-557-6678") and the user's access type 454 ("Guest (Self-Input)"). Furthermore, the user can be presented with a first option 460 ("Information is Correct: proceed with registration") to confirm the displayed information as reflecting the user's data correctly, as well as a second option 470 ("Make Changes?") to make corrections or otherwise change or edit the inputted information. In other implementations, the user may not be asked to confirm the information and may proceed directly to completion of registration as reflected in FIG. 4B.

Once the user confirms the information and registers with the system, he can be granted basic access to one or more organizational resources. One example is presented as a second enrollment interface 412 in FIG. 4B. For purposes of illustration, in this case, the visiting user 310 is provided with a confirmatory registration code 490 ("4A6TT"), granting him authority of a sufficient level to enable access of a conference room (as visually represented by a resource signage 360 in FIG. 3). The user can be satisfied that the information was accepted by the system per a message 480 ("Your registration is complete! You have Level 1 access. Please see an administrator for further information.") below his now-enrolled identifiers including his team association 402, name 430, and image 420. The user may in some implementations also receive an email, text, or other notification, which can include a security code, password, or other security token for resource access, as well as further instructions or tutorials regarding his newly acquired tools. For example, the user may be provided with a link via which he may log into the collaboration network or app for the organization and begin messaging or viewing information specific to his level of access. In another implementations, the user may be provided with a print-out identifying him as a verified user, and/or some other badge or physical token to facilitate his access to designated resources.

Figure 5A:
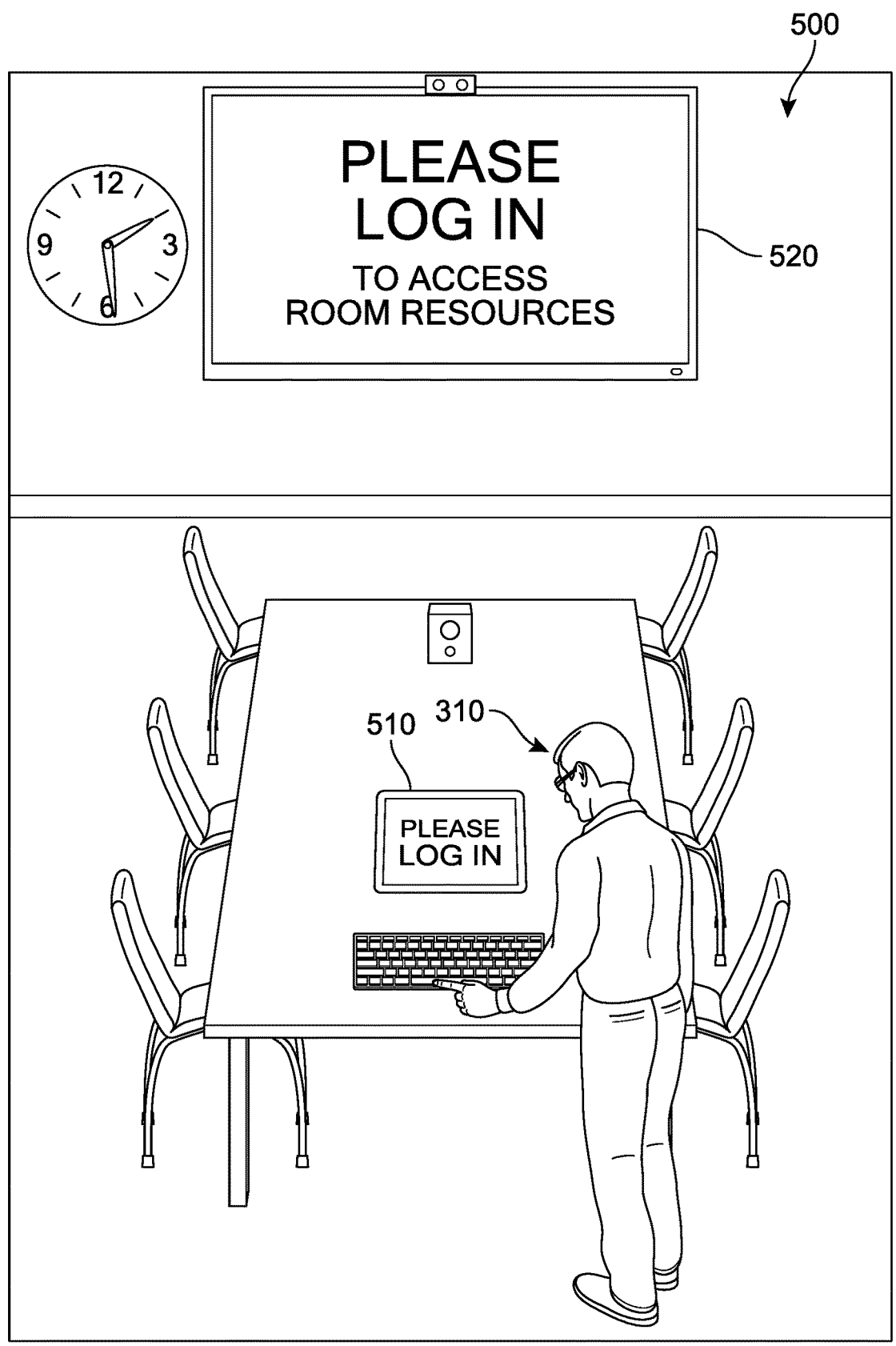
FIGS. 5A and 5B are implementations of a user access experience following self-enrollment.
Figure 5B:
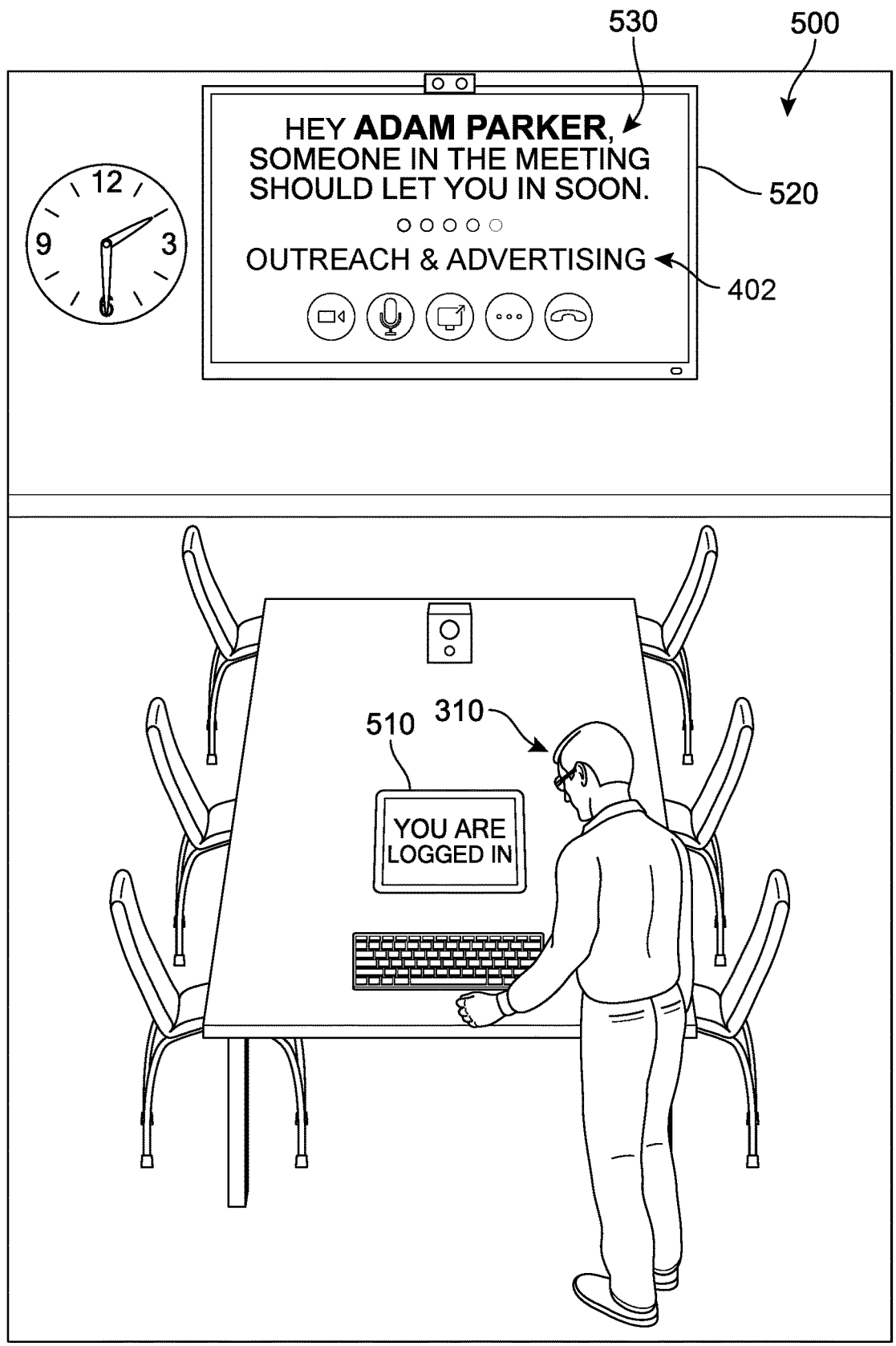

In order to better convey some of the potential benefits of the proposed system, the scenario continues in FIGS. 5A and 5B. In FIG. 5A, the visiting user 310 is shown having entered a room 500 corresponding to an organizational resource. The room 500 is a video-conferencing room, with a conference table, chairs, and audio-visual equipment 520. In different implementations, the user account created in FIGS. 3-4B can enable the visiting user 310 to access the resources of the room 500. For example, once the visiting user 310 arrives in the room 500, he may present or otherwise input his account access information (e.g., username, registration code, badge, etc.) and in response a resource permission system ("system") 510 can automatically initiate a search through a database (such as the organization directory or other membership or account listing) to determine whether the information or security token provided corresponds to a registered user account. Once the system 510 locates a user account and/or profile matching the user input, and the user's identity has been verified, the system 510 can be understood to have 'registered' or logged in the second user 320, as shown in FIG. 5B.

In some implementations, the visiting user 310, once registered, can be enabled to view additional system resources, calendars, contacts, communication tools, establish or connect with organizational network access, collaboration information, and other features. For example, the user may wish to set up or follow through with participation in a meeting that is occurring with members of the organization. In FIG. 5B, the visiting user 310, having been logged into the system 510, can proceed by initiating a request for access to a meeting management tool and selected a teleconference that is scheduled for the organizational group or team to which he had been granted basic access to following his self-enrollment and verification. In other words, the user is able to join a meeting without the delays or 'hoops' typically associated with permitting and providing access to new users. As represented by display 530, the user has initiated a connection to his desired meeting for his enrolled team association 402 and is able to confident in his ability to communicate with the team as needed. Thus, in this example, an external (to the organization) user has simply enrolled, self-verified, presented his information to log into the system, selected the target meeting, and been moved seamlessly and effortlessly into the desired connection experience.

Figure 6A:
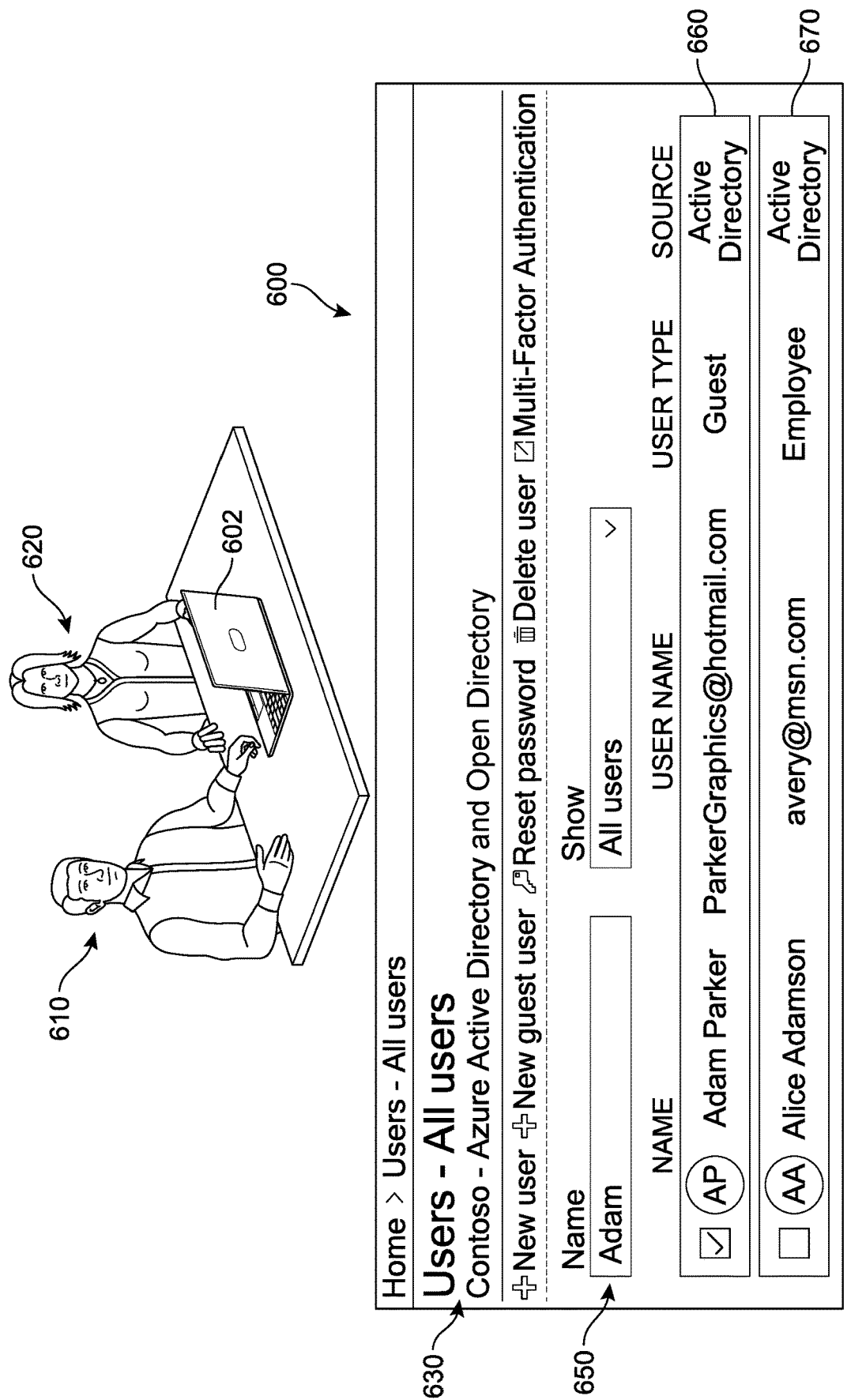
FIGS. 6A and 6B are implementations of an organizational approval process for the user of FIG. 3.

In different implementations, the scenario experienced by the visiting user 310 can become the basis of subsequent stages of verification or 'promotion' within the organizational directory. Referring to FIG. 6A, for purposes of illustration for the reader, an administrator 610 and a staff employee 620 of the organization are shown reviewing a directory interface 600 via a fourth device 602. In different implementations, internal organization members such as either the administrator 610 or the staff employee 620 or any other internal member of the organization can be associated with permissions that empower them to access membership information and approve requests for additional or different levels of access in the system. In some implementations, the staff employee 620 may be able to communicate to her administrator 610 that there is a new user who has been added to the system as an external directory member, and is requesting access to and membership in the internal directory. As shown in FIG. 6A, the administrator 610 can view the directory interface 600, access the user database 630, and search for the new user (here, by name "Adam") 650. The results offer two accounts, including a first account 660 ("Adam Parker") and a second account 670 ("Alice Adamson").

Figure 6B:
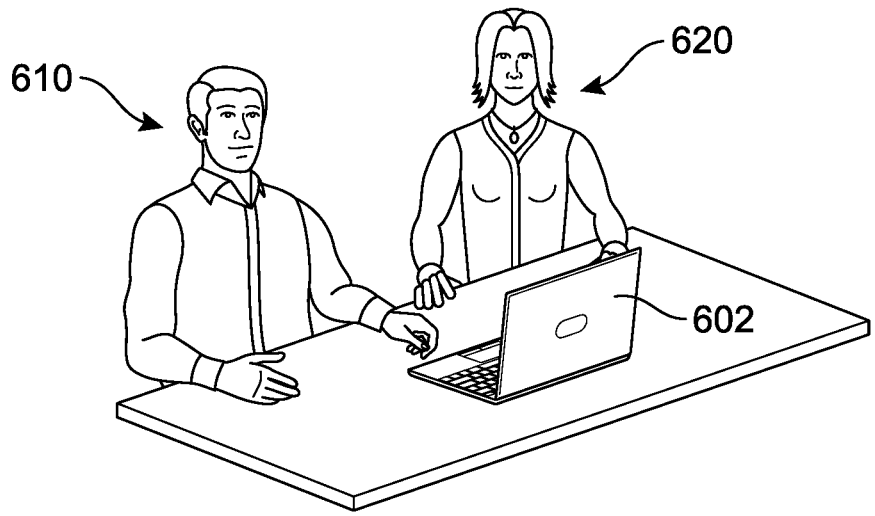

The administer 610 can select to view the first account 660, as reflected in FIG. 6B, where the information inputted earlier by the visiting user (see FIG. 3) is now available via an Add New Member interface 608. In other words, as the internal organization members decide to upgrade Mr. Parker's access in the system and transition him from an external directory member to an internal directory member, there is no need to recreate or re-enter the user account details, nor do they need to generate a new user record. Instead, the administrator simply reviews account data 606 for the user, engages in the established verification process, which in some implementations can be facilitated by a team member such as staff employee 620 who can 'vouch' for or verify the information, for example having met with Mr. Parker previously, having received paperwork for Mr. Parker, or through some other credentials. The user account can then be updated to the access level or type warranted by the information provided (see access type 654), and/or the internal member can affirm to the system that this new user's identity has been herein authenticated (field 680). Furthermore, the approver can be presented with a first option 690 ("Information is Correct: proceed with verification") to confirm the displayed information as reflecting data for a user that is being verified and/or promoted, as well as a second option 692 ("Make Changes?") to make corrections or otherwise change or edit the inputted information. Following confirmation, the user Mr. Parker may be transitioned to a new access level.

Figure 7:
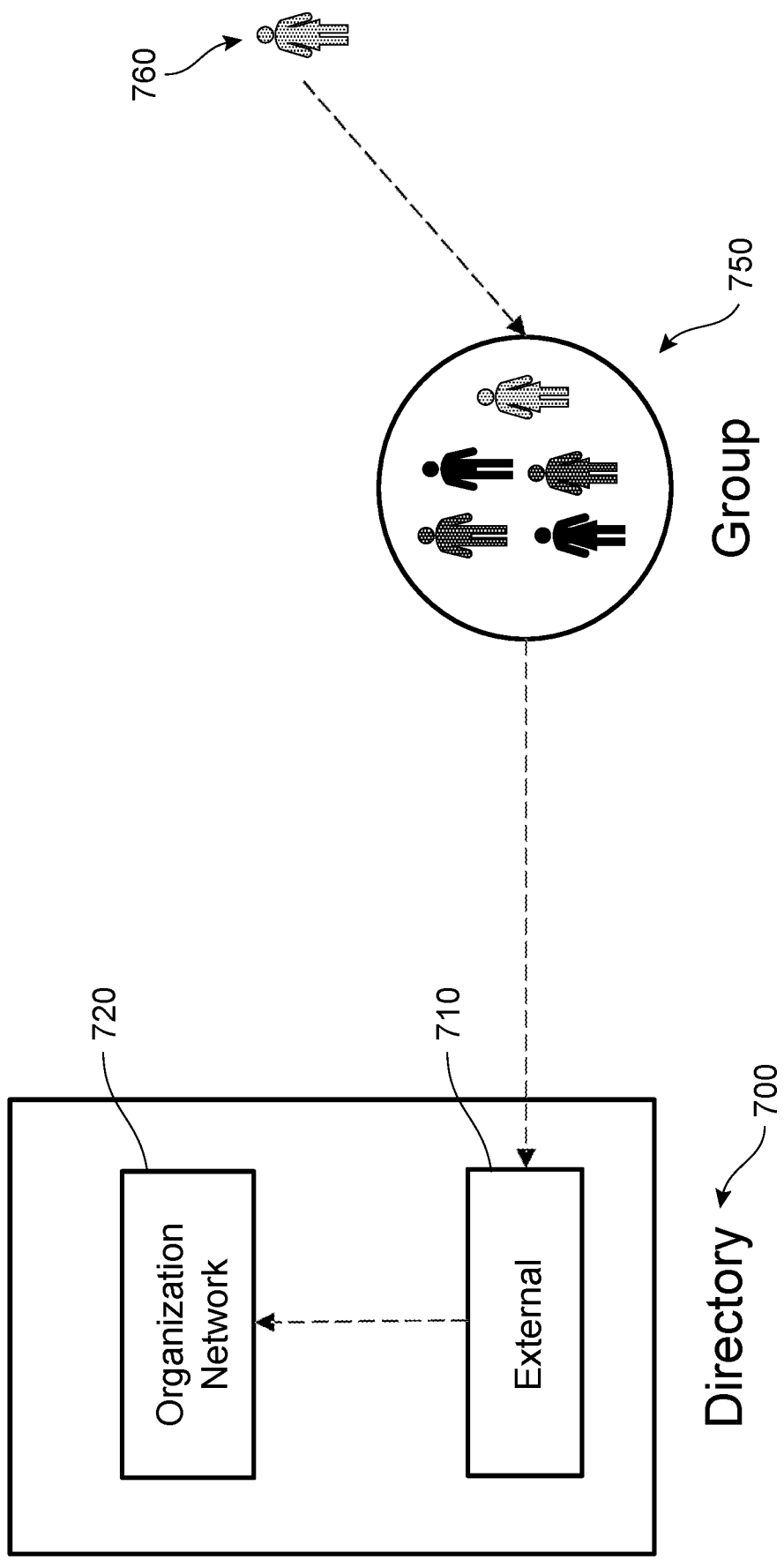
FIG. 7 is a high-level view of an implementation of a directory management structure.

For purposes of reference, another high-level diagram providing some insight into the proposed system is shown in FIG. 7. A directory 700 of the disclosed implementations, as noted above, can include an organization (internal) network 720, as well as an external network 710, which can comprise any number of groups of loosely connected individuals, as illustrated with a first group 750. In some cases, entities or individuals who are outside the first-tier organization network, such as a potential collaborator ("collaborator") 760, wish to be connected, request membership in the directory 700, or are invited by members of the first group 750. In different implementations, any existing organization member in the directory may be empowered to add others to the 'communication' group, even if the collaborator 760 is not already in the organization directory. Indeed, through this mechanism, the collaborator 760 can be quickly added to the group as a working group member by any other group member, allowing the group to grow and flourish without loss of efficiency or expenditure of unnecessary time. Furthermore, following a simplified self-enrollment and verification, the collaborator 760 can move seamlessly into full participation in that communication group, (albeit with limited privileges), and edit her profile via the collaboration application for that organization. In addition, based on the configured rules established by the organization for this process, the collaborator's profile is available for review by designated authority (e.g., by her manager or area manager). As described above, such a designated authority may review the profile and approve the user for conversion to full-privileged (or higher-privileged) membership in the organization, resulting in enhanced or full privileges for the collaborator.

Thus, the proposed system enables a decentralized process and directory architecture whereby initial user additions to a directory can occur without any verification. In such cases, both the new user and the organization have visibility of the directory membership. As another simple example, if a user is added to a chat group based on his or her phone number, the phone number will be added to the organization's directory. The user can view and edit their profile. Eventually, when approval is obtained through the organization, he or she can become a member of the organization directory. In addition, organization administrators can setup or establish a wide range of policies for the verification of newly added users. It is important to note that these policies can be dynamic based on the directory attributes. For example, the organization directory may include a "ReportsTo:" attribute. If a new user (User B) is being added and will report to User A, then in some implementations, the policy can authorize User A (who is already verified) to verify user B. At any time this policy can change, such that verification process can be adjusted or fitted to the needs of the organization.

Figure 8:
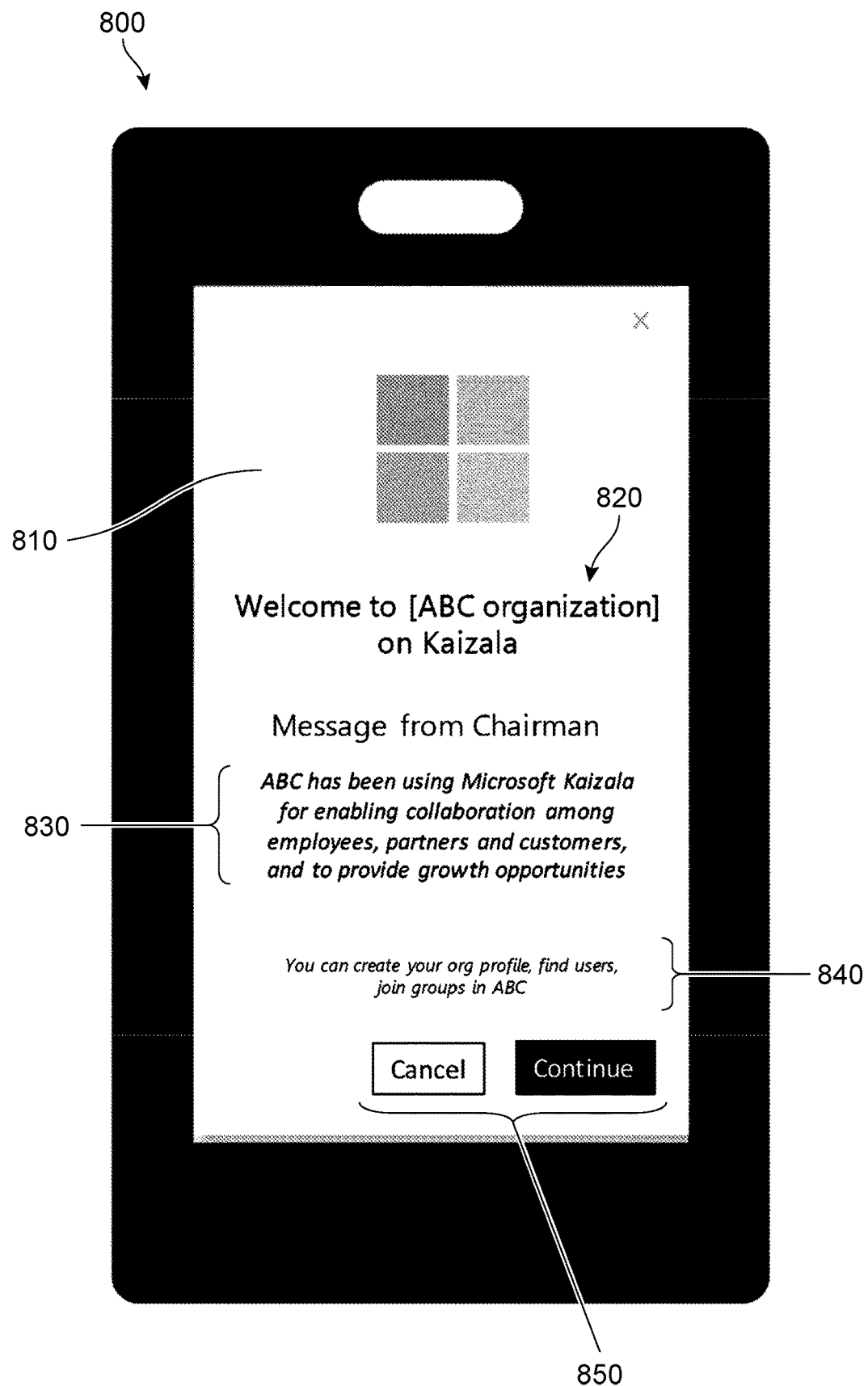
FIGS. 8, 9 and 10 are implementations of a user interface for facilitating enrollment of a new user to an organization via a collaboration application.
Figure 9:
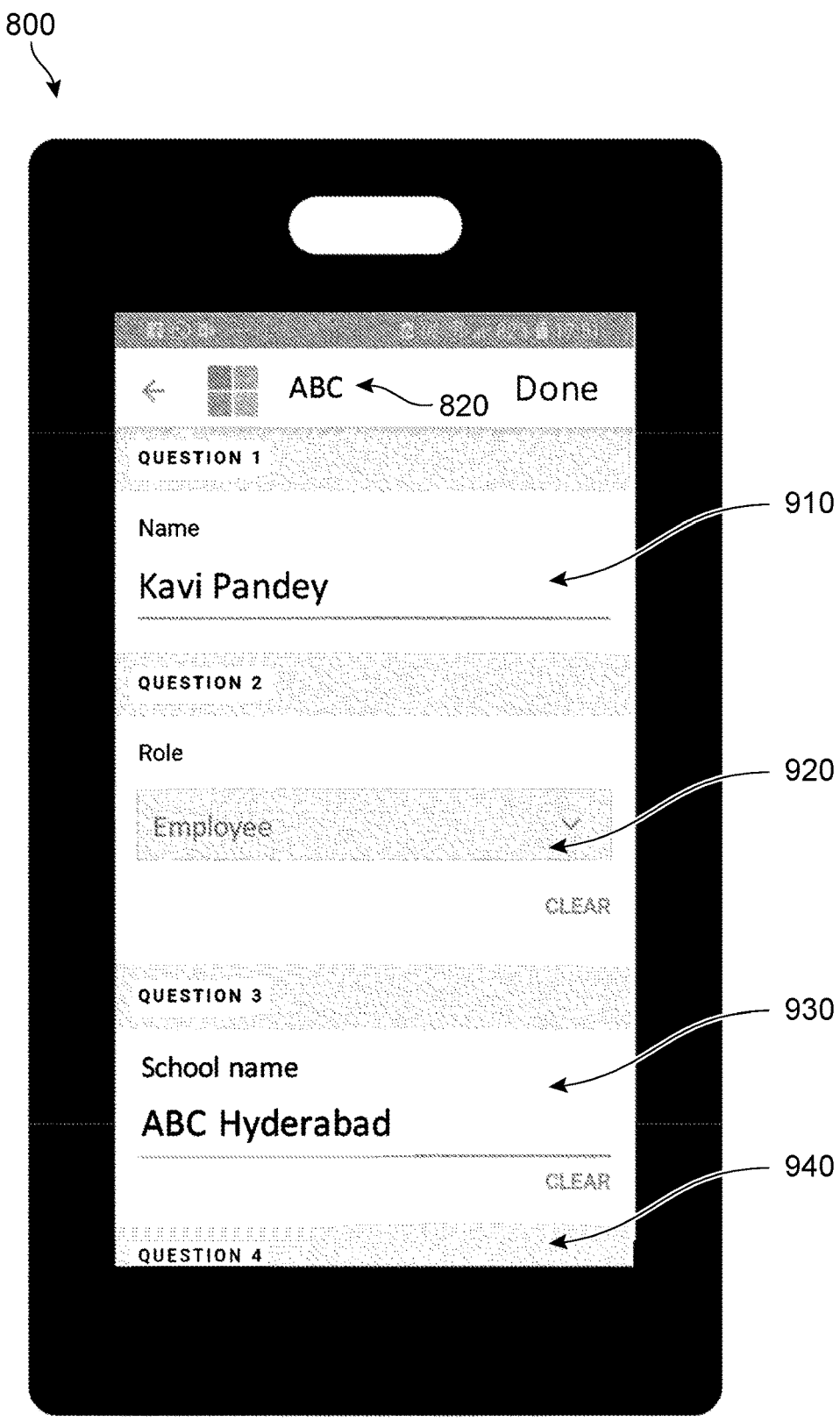
Figure 10:
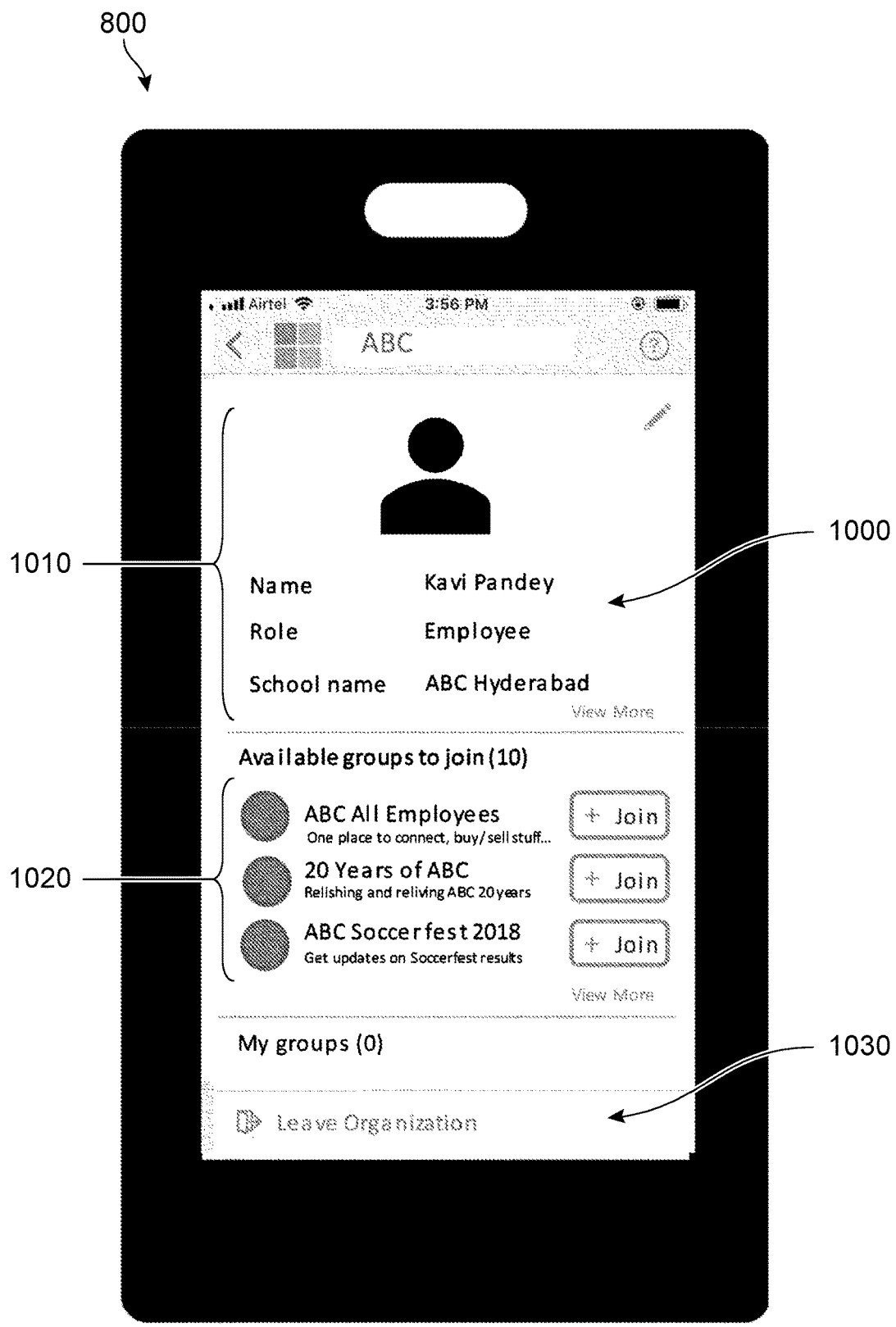

As a further example, FIGS. 8-10 depict an implementation of a sequence of user interfaces that may be presented to a user seeking to enroll as a potential member of a group working via a collaboration application. In FIG. 8, a mobile device 800 displays a first interface 810 configured for notifying the user of the available invite or possible membership via a welcome message 820 ("Welcome to ABC organization on Kaizala") and introductory message 830 ("Message from Chairman: ABC has been using Microsoft Kaizala® for enabling collaboration among employees, partners, and customers, and to provide growth opportunities" followed by notice 840 ("You can create your org profile, find users, join groups in ABC"). In this example, it can be understood that "Kaizala" represents only one of many possible collaboration application that may benefit from the disclosed systems and methods. Thus, references to a collaboration application, or simply "application", throughout this disclosure can refer to programs such as Skype®, Microsoft Teams®, Microsoft Kaizala®, Microsoft Outlook®, GoToMeeting®, WebEx®, Zoom®, Join.Me®, Calendy®, WhatsApp®, Slack®, Yammer®, Rocket.Chat®, Fleep®, Stride®, Flock®, Ryver®, uShare.to®, Wimi®, Twist®, JANDI®, Quip®, Viber®, LINE®, KakaoTalk®, Facebook Messenger®, LiveProfile®, GroupMe®, Kik Messenger®, ChatON®, WeChat®, Boomerang Calendar®, Telegram®, Imo®, Nimbuzz Messenger®, Yahoo! Messenger®, Tango®, GroupMe®, ICQ®, GO SMS®, BBM®, Hike Messenger®, Snapchat®, Instagram®, Voxer®, Voxer®, FreeBusy®, NeedToMeet®, Meekan®, Google Calendar®, GoogleHangouts®, AnyMeeting® and other applications that can provide collaboration tools and/or facilitate communication or social networking online. These are non-limiting examples, and any other communication- or collaboration-related application may benefit from the disclosed implementations. Specific references to a software application by name throughout this description should not therefore be understood to limit the use of the proposed systems and methods.

As shown in FIG. 8, an end-user ("Kavi Pandey"), who is an employee at ABC Organization Hyderabad, receives a welcome message to join ABC organization on Kaizala. He can select an option (see options 850) to cancel the joining process, or he may opt to continue. If he chooses to continue, he can be asked to select his role and provide his user details for the ABC organization, as shown in a second interface 900 of FIG. 9. In some implementations, the process can include a series of questions, such as name 910, role 920, school name 930, and optionally other questions 940. Although other types of enrollment interfaces can be used, this type of question-answer interface often makes the enrollment process easier and less confusing for many users.

Although Kavi was invited to this collaboration application in this example, it should be understood that in other implementations, the end-user may simply be a searching for various groups that are publicly available. In some cases, groups using a collaboration application can be configured so that the group is discoverable by users who are not (yet) subscribers or otherwise members of the group. For example, the group may be made to be discoverable via for example internet search engines and the like, using for example names or tags that are made available to search engines. As another example, a group may be made discoverable to users based on characteristics of the user. For example, the group may be made discoverable to users based on the location of the user such that only users who are located in or associated with a particular location can discover the group. This can be particularly useful when for example the group is run by or on behalf of a company that only provides local services, or if the group is run by or on behalf of a local or regional or national government authority or the like so that only users in the area covered by the authority can discover the group. In another example, a group may be made discoverable to users based on the user reading a QR (quick response) or other code (such as a bar code) or using optical character recognition or the like using a user device to scan the code or the like from some literature or other publication relevant to the group. The scanned code may be sent by the user device to the collaboration application as part of the user's request sent to the collaboration application to become a member or subscriber. Another example may similarly provide details of the group to a user device as part of a transaction (e.g., a purchase) made using the user device at a suitably configured point-of-sale device or some Internet-of-Things device.

In different implementations, after creating an account, the end-user Kavi is navigated to his/her 'org profile' 1010 on the collaboration application (see FIG. 10) via third interface 1000. Because Kavi is not a member of any of ABC's organization groups yet, he may search or view publicly available ABC groups 1020 to join. As his profile becomes approved for greater access (for example, by an organization administrator), he may be given access rights to view all groups (private or public) to join. If at some point Kavi no longer wishes to participate in the group, he may be offered an option 1030 to leave the organization.

Figure 11:
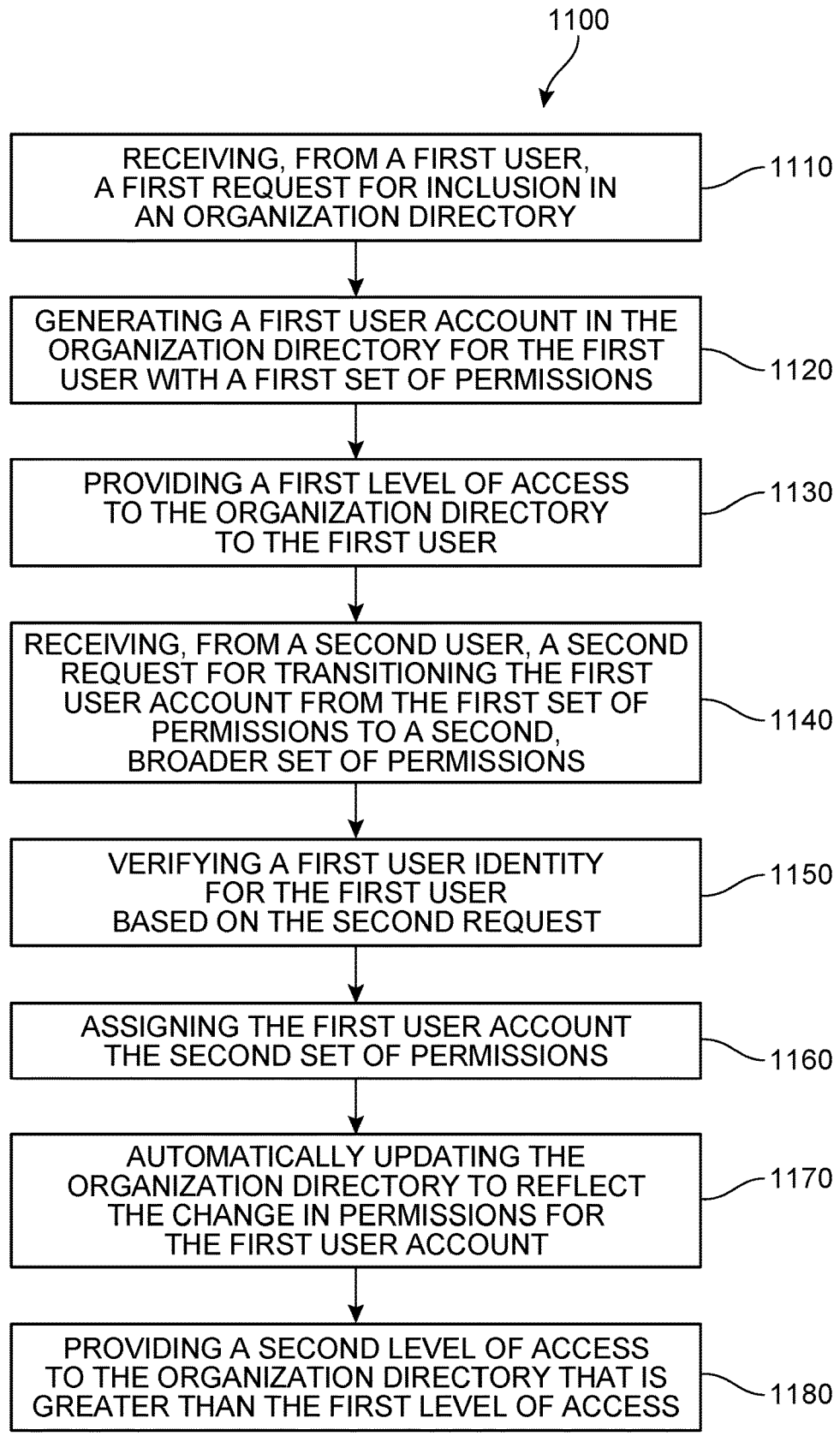
FIG. 11 is a flow diagram of an implementation of a process for enrolling users in an organization directory.

FIG. 11 is a flow chart illustrating an implementation of a method 1100 of managing membership in an organization directory as performed by a data processing system. In FIG. 11, a first step 1110 includes receiving, from a first user, a first request for inclusion in an organization directory configured to facilitate access to a collaboration application. The first request may be received as a signal over a first communication channel. The first data communication channel may be over a network or may be received via a user interface of the data processing system. In some implementations, the first request includes at least a first user profile item for the first user, such as a contact phone number, email address, mailing address, or other means of contacting the first user. A subsequent second step 1120 includes generating a first user account in the organization directory for the first user based on the first request. The first user account can be assigned a first set of (limited) permissions. In some implementations, the first user account can also include a first user profile that lists at least the first user profile item, user name, and/or other user information. A third step 1130 includes providing, to the first user, a first level of access to the organization directory. The first level of access can be based on the first set of permissions being assigned to the first user account. A fourth step 1140 involves receiving, from a second user, a second request for transitioning the first user account from the first set of permissions to a second, broader set of permissions. The first request may be received as a signal over a second communication channel. The second data communication channel may be over a network or may be received via a user interface of the data processing system. The first and second data communication channels may be the same or different data channels. The second user can be authorized or empowered to request this transition by association with a third set of permissions that is at least as broad as the second set of permissions.

In addition, the method 1100 includes a fifth step 1150 of verifying a first user identity for the first user based on the second request and a sixth step 1160 of assigning the first user account the second set of permissions. A seventh step 1170 includes automatically updating the organization directory to reflect the change in permissions for the first user account, and an eighth step 1180 includes providing a second level of access to the organization directory to the first user that is greater than the first level of access based on the second set of permissions being assigned to the first user account.

In other implementations, the method can include additional or alternate steps. For example, the method can further include automatically approving, in response to a first access attempt by the first user, membership of the first user in a first group. In such cases, membership can be understood to enable a first number of communication services (e.g., instant messaging, team meetings, teleconferencing, chatting, etc.) between the first user and other members of the first group via the collaboration application. The first group includes members with the first level of access to the organization directory. The method can also include automatically denying, prior to receiving the second request from the second user, in response to a second access attempt by the first user, membership in a second group, where the second group includes only members with the second level of access to the organization directory.

In some implementations, the method can also include automatically approving (subsequent to receiving the second request from the second user) membership of the first user in the second group, in response to a third access attempt by the first user, and then automatically updating the organization directory to reflect this change in membership of the second group. In another example, the method can include receiving from the first user (prior to receiving the second request from the second user) a third request to modify the first user profile, and then automatically updating, in response to the third request, the first user profile. In addition, the method can include receiving from the second user (subsequent to verification of the first user identity) a fourth request to modify the first user profile, and then automatically updating, in response to the fourth request, the first user profile.

Furthermore, the method can in some implementations include receiving, from the second user, a third request for transitioning the first user account from the second set of permissions to a fourth, broader set of permissions, determining that the third set of permissions associated with the second user is of an insufficient level or authority for approving assignment of the fourth set of permissions to the first user, and thereby denying the third request. As another example, the method may involve receiving, from the first user, a third request to invite a third user to join the first group, providing an invitation to the third user to join the first group, receiving, from the third user, acceptance of the invitation, and then adding the third user to the first group and automatically updating the organization directory to reflect a change in membership of the first group.

In one implementation, the method may also include receiving, from a third user, a third request for inclusion in the organization directory, and generating a second user account in the organization directory for the third user based on the third request. The second user account can be assigned the first set of permissions and including a second user profile corresponding to the third user. The method can also include providing the first level of access to the organization directory to the third user based on the first set of permissions being assigned to the second user account, and receiving, from the first user, a fourth request for transitioning the second user account from the first set of permissions to the second set of permissions. In addition, the method may include verifying a second user identity for the third user based on the fourth request, assigning the second user account the second set of permissions, automatically updating the organization directory to reflect the change in permissions for the second user account, and providing the second level of access to the organization directory to the third user.

Furthermore, in some implementations, the second user is a member of the first group, and in another implementation the second user is an administrator for the first group. In another example, the communication services offered to the first user automatically increase from the first number to a second, larger number, subsequent to verification of the first user identity.

For the sake of simplicity of description, details are not provided herein for performing various directory system and processes described herein and the configuration of different collaboration application and directory components. Implementations of the present disclosure can make use of any of the features, systems, components, devices, and methods described in each of the Attachments A-J which have been filed with, and are included herein as portions of, this specification.

The detailed examples of systems, devices, and techniques described in connection with FIGS. 1-11 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 12:
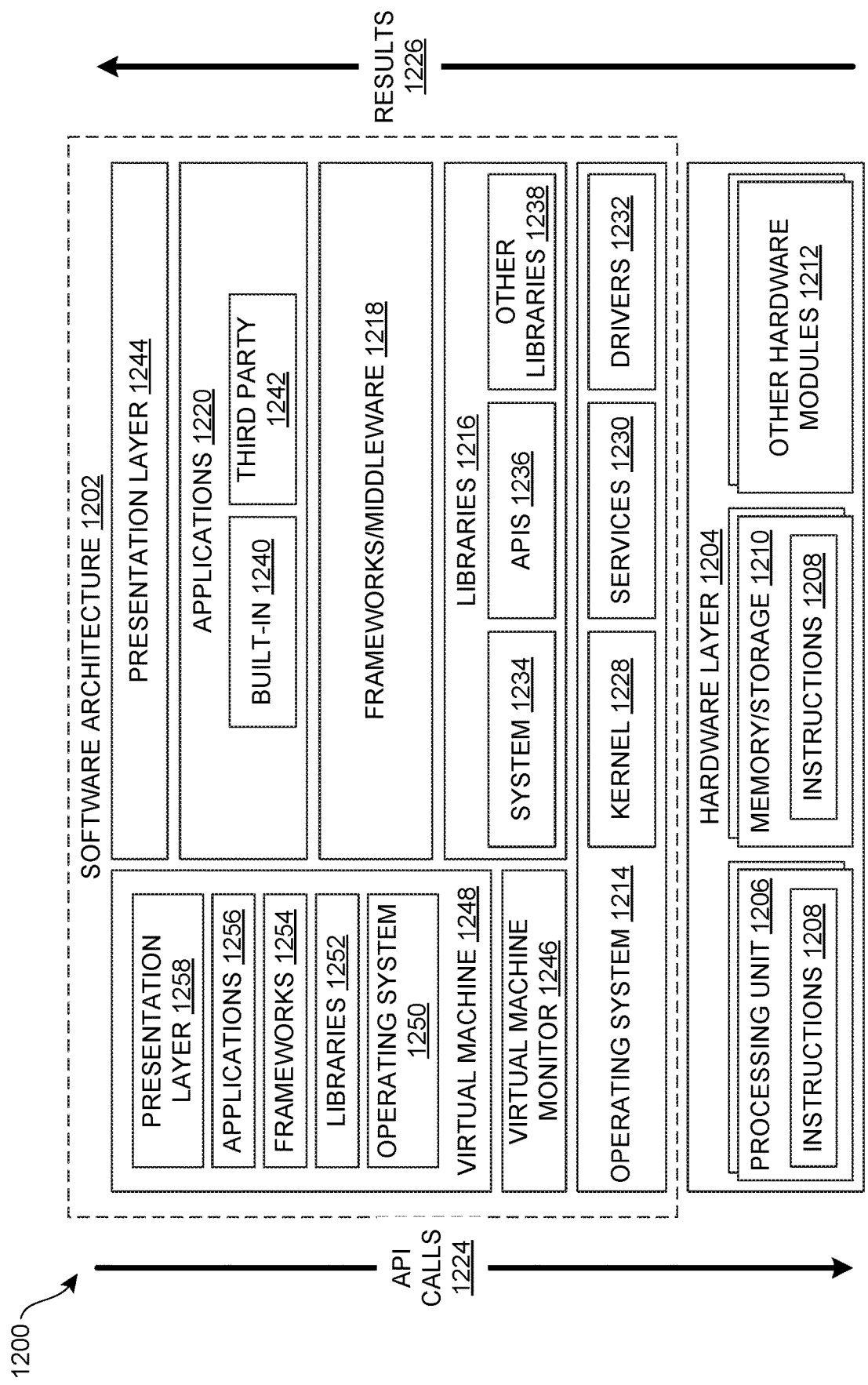
FIG. 12 is a block diagram of an example computing device, which may be used to provide implementations of the mechanisms described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware such as the computing devices of FIGS. 1-13 that includes, among other things, document storage, processors, memory, and input/output (I/O) components. A representative hardware layer 1204 is illustrated and can represent, for example, the computing devices of FIGS. 1-11. The representative hardware layer 1204 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1208 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1216 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services. The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine. The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1250, libraries 1252, frameworks 1254, applications 1256, and/or a presentation layer 1258.

Figure 13:
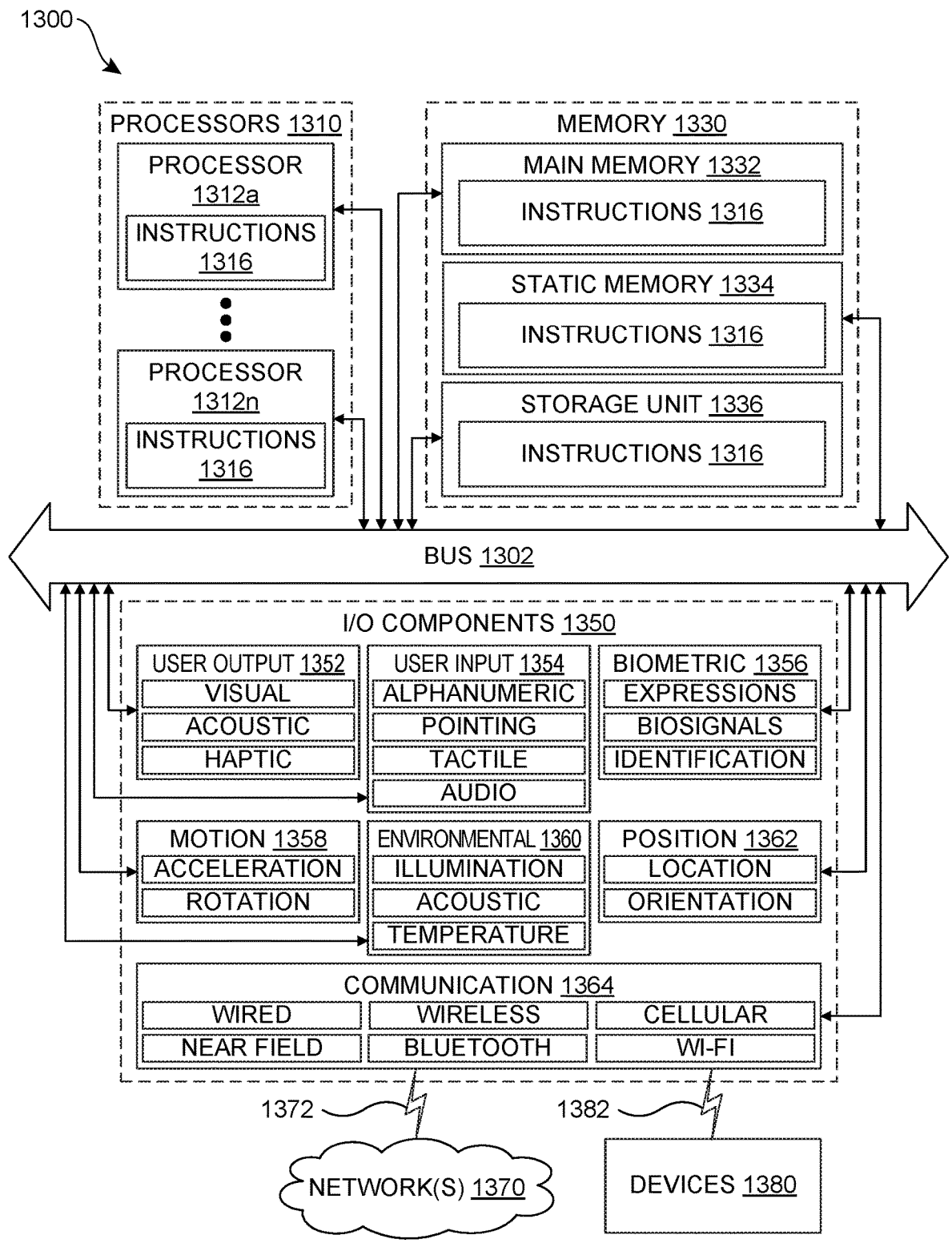
FIG. 13 is a block diagram illustrating components of an example machine configured to read instructions from a machine-readable medium.

FIG. 13 is a block diagram illustrating components of an example machine 1300 configured to read instructions from a machine-readable medium (for example, a machine-readable storage medium) and perform any of the features described herein. The example machine 1300 is in a form of a computer system, within which instructions 1316 (for example, in the form of software components) for causing the machine 1300 to perform any of the features described herein may be executed. As such, the instructions 1316 may be used to implement modules or components described herein. The instructions 1316 cause unprogrammed and/or unconfigured machine 1300 to operate as a particular machine configured to carry out the described features. The machine 1300 may be configured to operate as a standalone device or may be coupled (for example, networked) to other machines. In a networked deployment, the machine 1300 may operate in the capacity of a server machine or a client machine in a server-client network environment, or as a node in a peer-to-peer or distributed network environment. Machine 1300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1300 is illustrated, the term "machine" includes a collection of machines that individually or jointly execute the instructions 1316.

The machine 1300 may include processors 1310, memory 1330, and I/O components 1350, which may be communicatively coupled via, for example, a bus 1302. The bus 1302 may include multiple buses coupling various elements of machine 1300 via various bus technologies and protocols. In an example, the processors 1310 (including, for example, a central processing unit (CPU), a graphics processing unit (GPU), a digital signal processor (DSP), an ASIC, or a suitable combination thereof) may include one or more processors 1312a to 1312n that may execute the instructions 1316 and process data. In some examples, one or more processors 1310 may execute instructions provided or identified by one or more other processors 1310. The term "processor" includes a multi-core processor including cores that may execute instructions contemporaneously. Although FIG. 13 shows multiple processors, the machine 1300 may include a single processor with a single core, a single processor with multiple cores (for example, a multi-core processor), multiple processors each with a single core, multiple processors each with multiple cores, or any combination thereof. In some examples, the machine 1300 may include multiple processors distributed among multiple machines.

The memory/storage 1330 may include a main memory 1332, a static memory 1334, or other memory, and a storage unit 1336, both accessible to the processors 1310 such as via the bus 1302. The storage unit 1336 and memory 1332, 1334 store instructions 1316 embodying any one or more of the functions described herein. The memory/storage 1330 may also store temporary, intermediate, and/or long-term data for processors 1310. The instructions 1316 may also reside, completely or partially, within the memory 1332, 1334, within the storage unit 1336, within at least one of the processors 1310 (for example, within a command buffer or cache memory), within memory at least one of I/O components 1350, or any suitable combination thereof, during execution thereof. Accordingly, the memory 1332, 1334, the storage unit 1336, memory in processors 1310, and memory in I/O components 1350 are examples of machine-readable media.

As used herein, "machine-readable medium" refers to a device able to temporarily or permanently store instructions and data that cause machine 1300 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1316) for execution by a machine 1300 such that the instructions, when executed by one or more processors 1310 of the machine 1300, cause the machine 1300 to perform and one or more of the features described herein. Accordingly, a "machine-readable medium" may refer to a single storage device, as well as "cloud-based" storage systems or storage networks that include multiple storage apparatus or devices.

The I/O components 1350 may include a wide variety of hardware components adapted to receive input, provide output, produce output, transmit information, exchange information, capture measurements, and so on. The specific I/O components 1350 included in a particular machine will depend on the type and/or function of the machine. For example, mobile devices such as mobile phones may include a touch input device, whereas a headless server or IoT device may not include such a touch input device. The particular examples of I/O components illustrated in FIG. 13 are in no way limiting, and other types of components may be included in machine 1300. The grouping of I/O components 1350 are merely for simplifying this discussion, and the grouping is in no way limiting. In various examples, the I/O components 1350 may include user output components 1352 and user input components 1354. User output components 1352 may include, for example, display components for displaying information (for example, a liquid crystal display (LCD) or a projector), acoustic components (for example, speakers), haptic components (for example, a vibratory motor or force-feedback device), and/or other signal generators. User input components 1354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1350 may include biometric components 1356 and/or position components 1362, among a wide array of other environmental sensor components. The biometric components 1356 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1362 may include, for example, location sensors (for example, a Global Position System (GPS) receiver), altitude sensors (for example, an air pressure sensor from which altitude may be derived), and/or orientation sensors (for example, magnetometers).

The I/O components 1350 may include communication components 1364, implementing a wide variety of technologies operable to couple the machine 1300 to network(s) 1370 and/or device(s) 1380 via respective communicative couplings 1372 and 1382. The communication components 1364 may include one or more network interface components or other suitable devices to interface with the network (s) 1370. The communication components 1364 may include, for example, components adapted to provide wired communication, wireless communication, cellular communication, Near Field Communication (NFC), Bluetooth communication, Wi-Fi, and/or communication via other modalities. The device(s) 1380 may include other machines or various peripheral devices (for example, coupled via USB).

In some examples, the communication components 1364 may detect identifiers or include components adapted to detect identifiers. For example, the communication components 1364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1362, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:

a processor; and a non-transitory computer readable media including instructions which, when executed by the processor, cause the processor to:

receive a first signal, over a first data communication channel, wherein the first signal includes a first request from a first user for inclusion in an organization directory stored in a memory associated with the processor and configured to facilitate access to a collaboration application, the first request including at least a first user profile item for the first user;

generate a first user account in the organization directory for the first user based on the first request, the first user account being assigned a first set of permissions and including a first user profile listing the first user profile item;

provide, to the first user, a first level of access to the organization directory based on the first set of permissions being assigned to the first user account;

receive a second signal, over a second data communication channel, wherein the second signal includes a second request from a second user for transitioning the first user account from the first set of permissions to a second, broader set of permissions, the second user being associated with a third set of permissions that is at least as broad as the second set of permissions;

verify a first user identity for the first user based on the second request;

assign, in response to verifying the first user identity, the first user account the second set of permissions;

automatically update the organization directory to reflect a change in permissions for the first user account;

provide a second level of access to the organization directory to the first user that is greater than the first level of access based on the second set of permissions being assigned to the first user account;

automatically approve, subsequent to receiving the second request from the second user, in response to an access attempt by the first user, membership of the first user in a limited group, limited to only users having at least the second level of access, the membership enabling a greater number of communication services between the first user and other members of the limited group via the collaboration application than communication services available to a first group comprising members with only the first level of access to the organization directory; and automatically update the organization directory to reflect a change in membership of the limited group.

2. The system of claim 1, wherein the instructions further cause the processor to:

automatically approve, in response to a first access attempt by the first user, membership of the first user in the first group, the membership enabling a first number of communication services between the first user and other members of the first group via the collaboration application, the first group comprising members with the first level of access to the organization directory; and automatically deny, prior to receiving the second request from the second user, in response to a second access attempt by the first user, membership in the limited group, the limited group comprising only members with the second level of access to the organization directory.

3. The system of claim 2, wherein the instructions further cause the processor to:

automatically approve, subsequent to receiving the second request from the second user, in response to a third access attempt by the first user, membership of the first user in the limited group; and automatically update the organization directory to reflect a change in membership of the limited group.

4. The system of claim 1, wherein the instructions further cause the processor to:

receive from the first user, prior to receiving the second request from the second user, a third request to modify the first user profile;

automatically update, in response to the third request, the first user profile;

receive from the second user, subsequent to verification of the first user identity, a fourth request to modify the first user profile; and automatically update, in response to the fourth request, the first user profile.

5. The system of claim 1, wherein the second user is a member of the first group.

6. The system of claim 1, wherein the second user is an administrator for the first group.

7. The system of claim 1, wherein the instructions further cause the processor to:

receive, from the second user, a third request for transitioning the first user account from the second set of permissions to a fourth, broader set of permissions;

determine that the third set of permissions associated with the second user is insufficient for approving assignment of the fourth set of permissions to the first user; and deny the third request.

8. The system of claim 3, wherein the communication services offered to the first user automatically increase from the first number to a second, larger number, subsequent to verification of the first user identity.

9. The system of claim 2, wherein the instructions further cause the processor to:

receive, from the first user, a third request to invite a third user to join the first group;

provide an invitation to the third user to join the first group;

receive, from the third user, acceptance of the invitation; and add the third user to the first group and automatically updating the organization directory to reflect a change in membership of the first group.

10. The system of claim 1, wherein the instructions further cause the processor to:

receive, from a third user, a third request for inclusion in the organization directory;

generate a second user account in the organization directory for the third user based on the third request, the second user account being assigned the first set of permissions and including a second user profile corresponding to the third user;

provide the first level of access to the organization directory to the third user based on the first set of permissions being assigned to the second user account;

receive, from the first user, a fourth request for transitioning the second user account from the first set of permissions to the second set of permissions;

verify a second user identity for the third user based on the fourth request;

assign the second user account the second set of permissions;

automatically update the organization directory to reflect the change in permissions for the second user account; and provide the second level of access to the organization directory to the third user.

11. A method performed by a data processing system comprising:

receiving a first signal, over a data communication channel, wherein the first signal includes a first request from a first user for inclusion in an organization directory configured to facilitate access to a collaboration application, the first request including at least a first user profile item for the first user;

generating a first user account in the organization directory for the first user based on the first request, the first user account being assigned a first set of permissions and including a first user profile listing the first user profile item;

providing, to the first user, a first level of access to the organization directory based on the first set of permissions being assigned to the first user account;

receiving a second signal, over a second data communication channel, wherein the second signal includes a second request from a second user for transitioning the first user account from the first set of permissions to a second, broader set of permissions, the second user being associated with a third set of permissions that is at least as broad as the second set of permissions;

verifying a first user identity for the first user based on the second request;

assigning, in response to verifying the first user identity, the first user account the second set of permissions;

automatically updating the organization directory to reflect the change in permissions for the first user account;

providing a second level of access to the organization directory to the first user that is greater than the first level of access based on the second set of permissions being assigned to the first user account;

automatically approving, subsequent to receiving the second request from the second user, in response to an access attempt by the first user, membership of the first user in a limited group, limited to only users having at least the second level of access, the membership enabling a greater number of communication services between the first user and other members of the limited group via the collaboration application than communication services available to a first group comprising members with only the first level of access to the organization directory; and automatically updating the organization directory to reflect a change in membership of the limited group.

12. The method of claim 11, further comprising:

automatically approving, in response to a first access attempt by the first user, membership of the first user in the first group, the membership enabling a first number of communication services between the first user and other members of the first group via the collaboration application, the first group comprising members with the first level of access to the organization directory; and automatically denying, prior to receiving the second request from the second user, in response to a second access attempt by the first user, membership in the limited group, the limited group comprising only members with the second level of access to the organization directory.

13. The method of claim 12, further comprising:

automatically approving, subsequent to receiving the second request from the second user, in response to a third access attempt by the first user, membership of the first user in the limited group; and automatically updating the organization directory to reflect a change in membership of the limited group.

14. The method of claim 11, further comprising:

receiving from the first user, prior to receiving the second request from the second user, a third request to modify the first user profile;

automatically updating, in response to the third request, the first user profile;

receiving from the second user, subsequent to verification of the first user identity, a fourth request to modify the first user profile; and automatically updating, in response to the fourth request, the first user profile.

15. The method of claim 11, wherein the second user is a member of the first group.

16. The method of claim 11, wherein the second user is an administrator for the first group.

17. The method of claim 11, further comprising:

receiving, from the second user, a third request for transitioning the first user account from the second set of permissions to a fourth, broader set of permissions;

determining that the third set of permissions associated with the second user is insufficient for approving assignment of the fourth set of permissions to the first user; and denying the third request.

18. The method of claim 13, wherein the communication services offered to the first user automatically increase from the first number to a second, larger number, subsequent to verification of the first user identity.

19. The method of claim 12, further comprising:

receiving, from the first user, a third request to invite a third user to join the first group;

providing an invitation to the third user to join the first group;

receiving, from the third user, acceptance of the invitation; and adding the third user to the first group and automatically updating the organization directory to reflect a change in membership of the first group.

20. The method of claim 11, further comprising:

receiving, from a third user, a third request for inclusion in the organization directory;

generating a second user account in the organization directory for the third user based on the third request, the second user account being assigned the first set of permissions and including a second user profile corresponding to the third user;

providing the first level of access to the organization directory to the third user based on the first set of permissions being assigned to the second user account;

receiving, from the first user, a fourth request for transitioning the second user account from the first set of permissions to the second set of permissions;

verifying a second user identity for the third user based on the fourth request;

assigning the second user account the second set of permissions;

automatically updating the organization directory to reflect the change in permissions for the second user account; and providing the second level of access to the organization directory to the third user.

* * * * *